A. C. PENTLAND.
Improvement in Hot-Water Heating Apparatus.

No. 114,595.

2 Sheets--Sheet 1.

Patented May 9, 1871.

Witnesses:

Inventor:
A. C. Pentland
Per
Attorneys.

AM. PHOTO-LITHOGRAPHIC CO. N.Y. (OSBORNE'S PROCESS.)

A. C. PENTLAND.
Improvement in Hot-Water Heating Apparatus.

No. 114,595.

2 Sheets--Sheet 2.

Patented May 9, 1871.

Witnesses:

Inventor:
A. C. Pentland,
Per
Attorneys.

UNITED STATES PATENT OFFICE.

ALEXANDER C. PENTLAND, OF PHILADELPHIA, PENNSYLVANIA.

Letters Patent No. 114,595, dated May 9, 1871.

IMPROVEMENT IN HOT-WATER HEATING APPARATUS.

The Schedule referred to in these Letters Patent and making part of the same.

*To all whom it may concern:*

Be it known that I, ALEXANDER C. PENTLAND, of Philadelphia, in the county of Philadelphia and State of Pennsylvania, have invented a new and improved Heating Apparatus; and I do hereby declare the following to be a full, clear, and exact description of the same, reference being had to the accompanying drawing making a part of this specification, in which—

Figure 1:
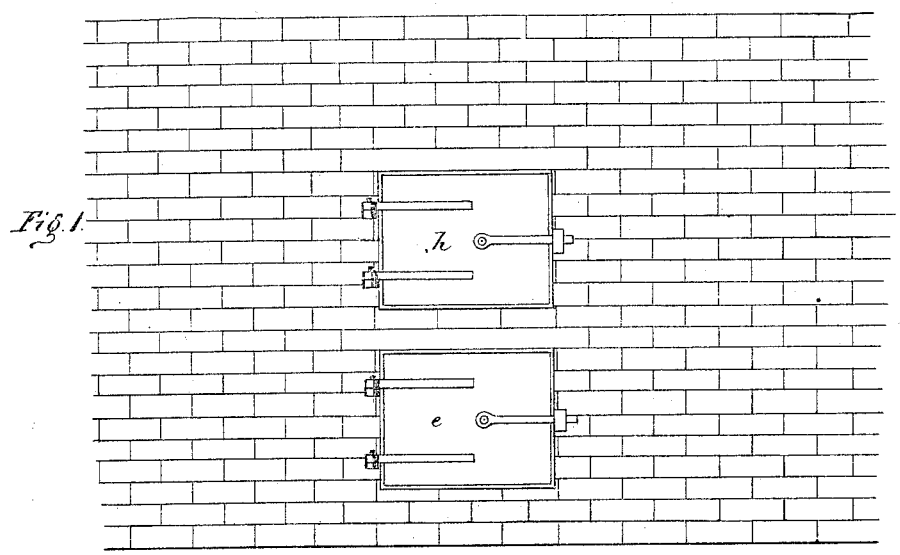
Figure 2:
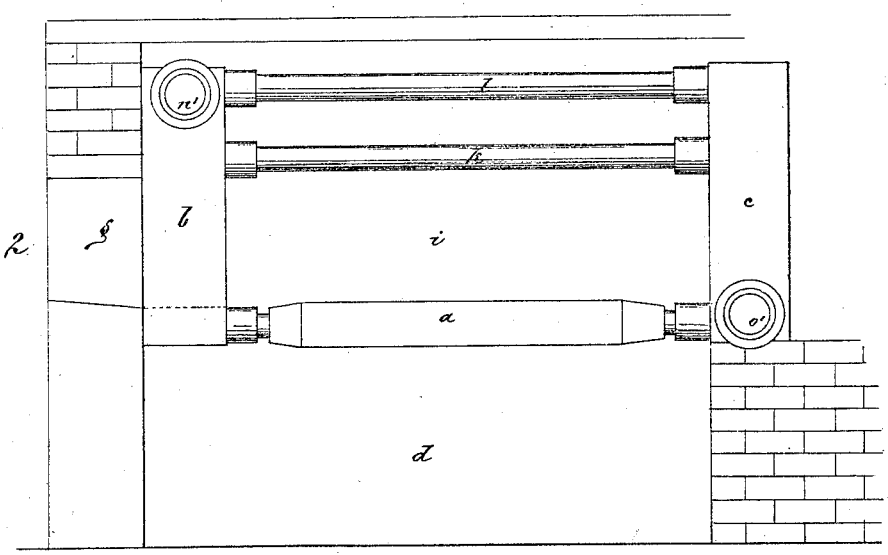
Figure 3:
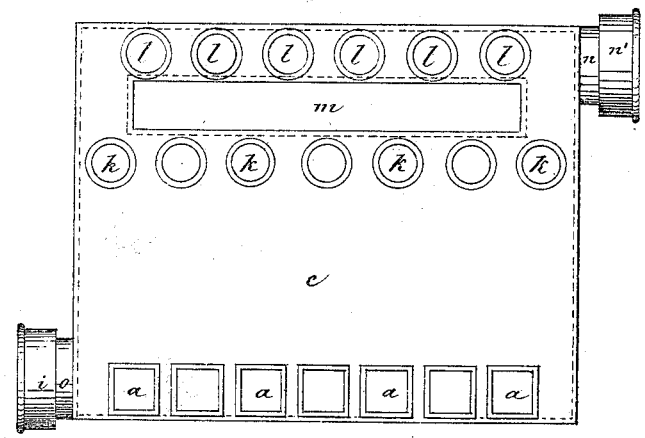
Figure 5:
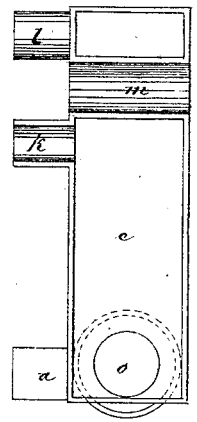
Figure 4:
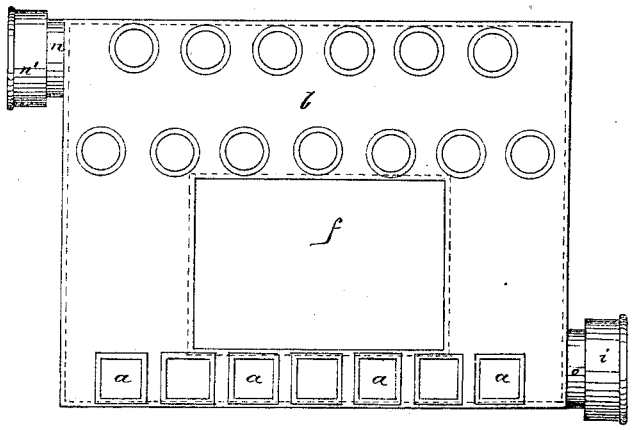
Figure 6:
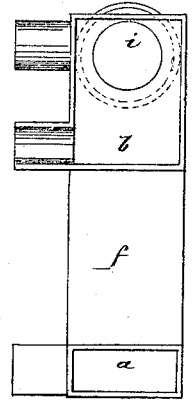

Figure 1 is a front elevation;
Figure 2 is a longitudinal vertical section;
Figures 3 and 4 are end views;
Figure 5 is a vertical section transverse of fig. 3; and
Figure 6 is a vertical section transverse of fig. 4.

My invention has for its object to furnish an improved apparatus for heating water to be circulated in a system of pipes arranged within a building; and It consists in a peculiar construction and arrangement of hollow grate-bars, a double series of superior bars, and of hollow end walls.

I do not claim essential novelty in any of these parts, *per se*, since all (considered as to their general character) have probably been used before in some way; but I aim to provide the public with a cheaper, more durable, and practically efficient heating apparatus than those now used.

Referring to the drawing—

*a* are parallel horizontal hollow grate-bars, rectangular in cross-section, and secured at each end to and communicating with hollow walls *b c* at the lower extremities of the same, which walls are supported in or on masonry, as shown, the grate-bars being placed high enough above the foundation of the masonry to leave an ash-pit, *d*, beneath them, which has a door, *e*, in the masonry.

The front wall *b* has an opening, *f*, made transversely through it, opposite which opening is an orifice, *g*, in the brick-work, said orifice being provided with a door, *h*.

The doorway *g* and opening *f* are for the purpose of introducing fuel which shall rest upon the grate-bars *a*, above which latter is a fire-chamber, *i*, and above the fire-chamber is a double series of parallel horizontal pipes, *k l*, connecting the two walls *b c*.

An opening, *m*, is made transversely through the rear walls *c*, between the ends of the two series of pipes *k l*, said opening serving as a flue for the escape of the products of combustion from the fire-chamber.

The wall *b* is provided with short tubes *n*, extending horizontally out of its upper corners, and shown covered with caps *n'*.

The wall *c* is likewise provided with short tubes *o*, extending horizontally out of its lower corners, and shown as covered with caps *o'*.

These tubes are for the connection with the walls *b c* of a system of pipes running through all those parts of the building which are to be heated, which system must be provided with an apparatus for enabling all the pipes, walls, and grate-bars to be filled with water.

This having been done, the effect of a fire kindled in the chamber *i* is to heat that portion of the water that lies contiguous to the fire in the walls, grate-bars, and pipes *k l*, and consequently to cause such heated water to flow to and issue out of the tubes *n* of the wall *b*, and ascend in the connected system of pipes, its place near the fire being supplied by cold water, which enters through the tubes *o*, and is in its turn warmed and sent off bearing heat to other regions.

In this way a constant circulation is kept up, and a continuous supply of warm water made to course through the heating-pipes.

Having thus described my invention,

What I claim as new, and desire to secure by Letters Patent, is—

The improved heating apparatus herein shown and described, formed of the hollow end walls *b* and *c*, provided respectively with the fuel and flame apertures *f* and *m*, and the double series of horizontal tubes *k l*, and grate-bars *a a*, all constructed and arranged as specified.

ALEXANDER C. PENTLAND.

Witnesses.
SOLON C. KEMON,
THOS. D. D. OURAND.